(No Model.)
S. M. HOAGLAND.
COOKING UTENSIL.
No. 523,524. Patented July 24, 1894.
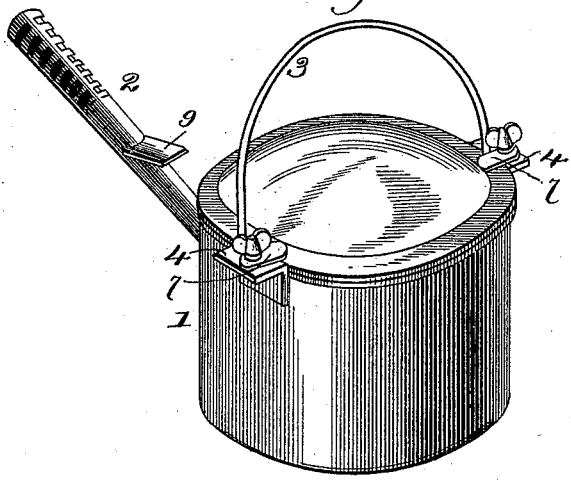
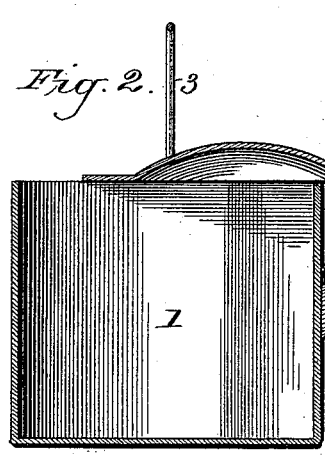
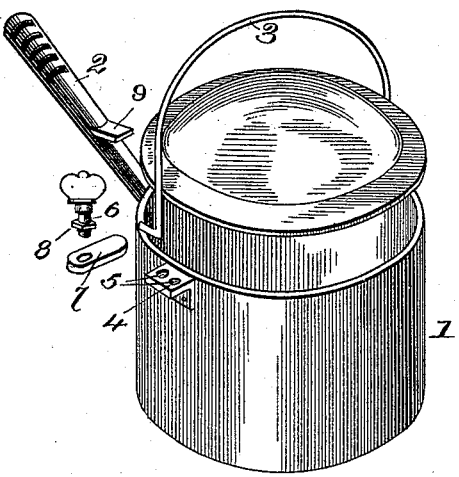
Witnesses
J. W. Reynolds
Chas. S. Nyer
Inventor
Susan M. Hoagland.
By John Wedderburn
Attorney

UNITED STATES PATENT OFFICE.

SUSAN M. HOAGLAND, OF HULBERTSON, NEW YORK.

COOKING UTENSIL.

SPECIFICATION forming part of Letters Patent No. 523,524, dated July 24, 1894.

Application filed February 12, 1894. Serial No. 499,937. (No model.)

*To all whom it may concern:*

Be it known that I, SUSAN M. HOAGLAND, a citizen of the United States, residing at Hulbertson, in the county of Orleans and State of New York, have invented certain new and useful Improvements in Cooking Utensils; and I do hereby declare the following to be a full, clear, and exact description of the invention, such as will enable others skilled in the art to which it appertains to make and use the same.

This invention relates to certain new and useful improvements in sauce-pans, or cooking utensils, and has for its object to provide simple and effective means in connection therewith, whereby water may be drained therefrom without burning the hands or removing the contents.

With these and other objects in view, the invention consists of the construction and arrangement of the several parts, which will be more fully hereinafter described and claimed.

In the drawings:—Figure 1 is a perspective view of a sauce-pan embodying the invention. Fig. 2 is a central longitudinal vertical section of the same with the lid or cover slightly removed. Fig. 3 is a detail perspective view of the sauce-pan with the attachments therefor disconnected from each other.

Similar numerals of reference are employed to indicate corresponding parts in the several views.

Referring to the drawings, the numeral 1 designates a sauce-pan or cooking utensil which is supplied with a handle 2 and bail 3 for the purpose of turning the water off from or out of the sauce-pan without burning the operator, it being seen that the cover is fastened so that it will not come off.

The bail ears 4 are in the form of shelf-like projections and are so arranged as to have the sauce-pan or cooking utensil act as a balance. Each ear is supplied with two openings 5, one at each end, the one toward the handle being for the attachment to the bail, and the other for the attachment of a rod 6 which is supplied with a foot 7, the said foot being fastened close up to the adjacent part of the bail and is turned round or over the cover, to secure the latter. On the rod, under the ear, is applied a burr or nut 8 to hold the said rod in place.

On the handle is a forwardly extending projection 9 which is adapted to hold the cover when the latter is shoved backward and prevent the said cover from tipping up while pouring out the water. The parts are so arranged that the bail drops back against the handle and not forwardly.

It is intended that the cover should be made of suitable thick material and bound at the edge by rolling or crimping the same and is perfectly flat for about half an inch from the said edge.

The handle is hollow and is preferably made of rolled iron and supplied with apertures or openings therein to prevent it from becoming too hot, as will be readily understood.

It is apparent that many minor changes in the construction and arrangement of the several parts might be made and substituted for those shown and described without in the least departing from the nature or spirit of the invention.

Having thus described the invention, what is claimed as new is—

In a sauce pan, the combination with a body having a handle provided with a forwardly extending projection, of a lid having a flange adapted to be slid under the said projection to hold the cover forward from the body, oppositely positioned guides or holders 7 on the upper portion of the body in the same plane as the said forwardly extending projection, and a bail, substantially as and for the purposes specified.

In testimony whereof I have signed this specification in the presence of two subscribing witnesses.

SUSAN M. HOAGLAND.

Witnesses:
JENNIE INGALLS,
ALBERT A. INGALLS.